United States Patent
Soga et al.

[11] Patent Number: 5,206,742
[45] Date of Patent: Apr. 27, 1993

[54] ONE-DIMENSIONAL CODING METHOD

[75] Inventors: Itsuya Soga; Reiko Soga, both of Hyogo, Japan

[73] Assignee: Mitsubishi Denki Kabushiki Kaisha, Tokyo, Japan

[21] Appl. No.: 678,413

[22] Filed: Apr. 1, 1991

[30] Foreign Application Priority Data

Apr. 11, 1990 [JP] Japan .................................. 2-95580

[51] Int. Cl.$^5$ .............................................. H04N 1/00
[52] U.S. Cl. .................................. 358/427; 358/261.1
[58] Field of Search ........................ 358/426–427, 358/261.1–261.3, 443, 447

[56]  References Cited

U.S. PATENT DOCUMENTS 4,701,803 10/1987 Sato ................................... 358/261.1
4,887,162 12/1989 Arai ...................................... 358/447
5,109,434 4/1992 Shimizu et al. ....................... 358/443

Primary Examiner—Stephen Brinich
Attorney, Agent, or Firm—Rothwell, Figg, Ernst & Kurz

[57] ABSTRACT

A one-dimensional coding method for compressing the amount of image data in facsimile machies and image filing systems. Unlike the prior art one-dimensional coding method which attaches an end-of-line code to every line, the method according to the invention attaches an end-of-line code to a plurality of lines equal to a predetermined number of lines. Alternatively, the novel method allows an end-of-line code to be attached to only selected lines according to a decision table in which are established beforehand the line numbers of the lines to which an end-of-line code is to be attached each.

9 Claims, 11 Drawing Sheets

EOL: 000000000001
RTC: 000000000001 · · · 000000000001
(6 EOL'S IN TOTAL)

EOL: 000000000001
RTC: 000000000001 · · · · · 000000000001
(6 EOL'S IN TOTAL)

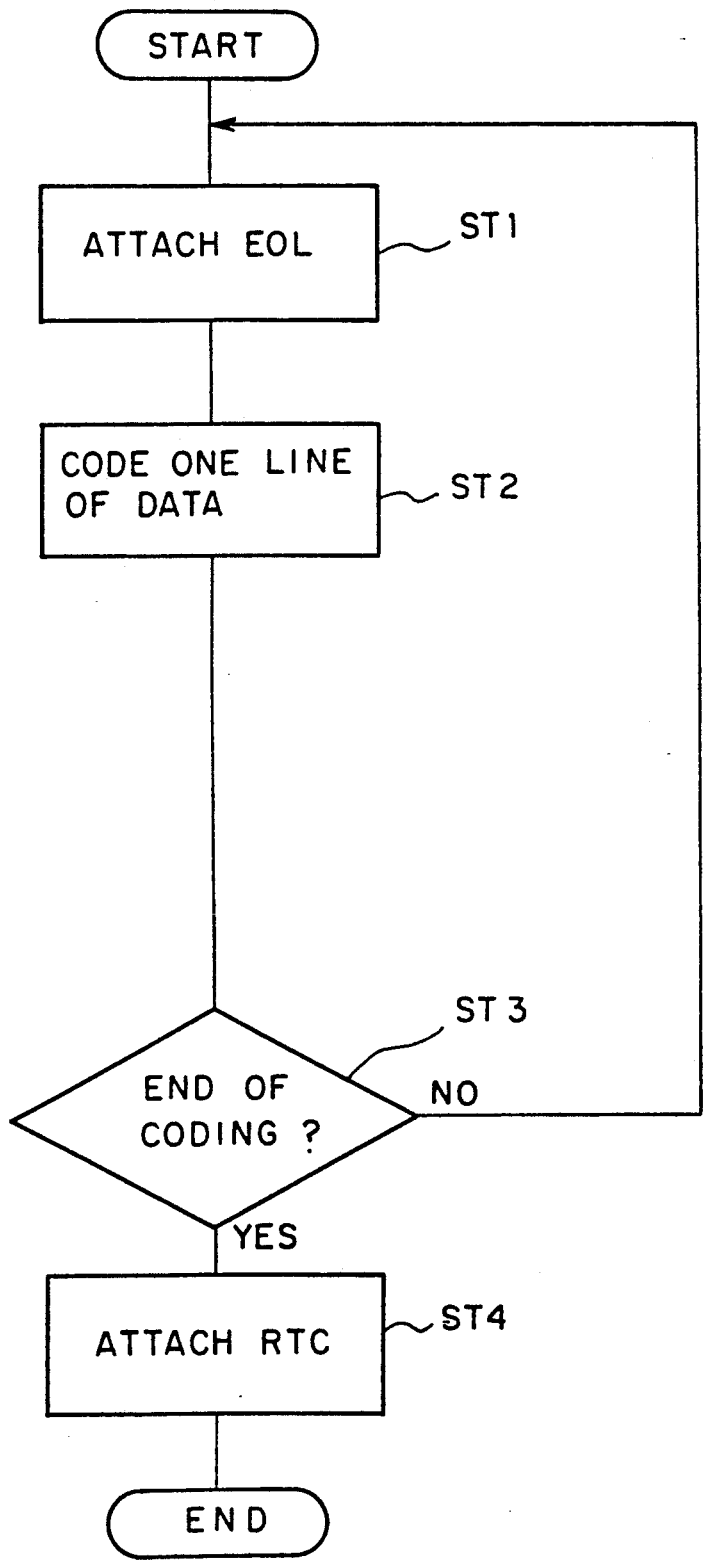

FIG. 3(b)
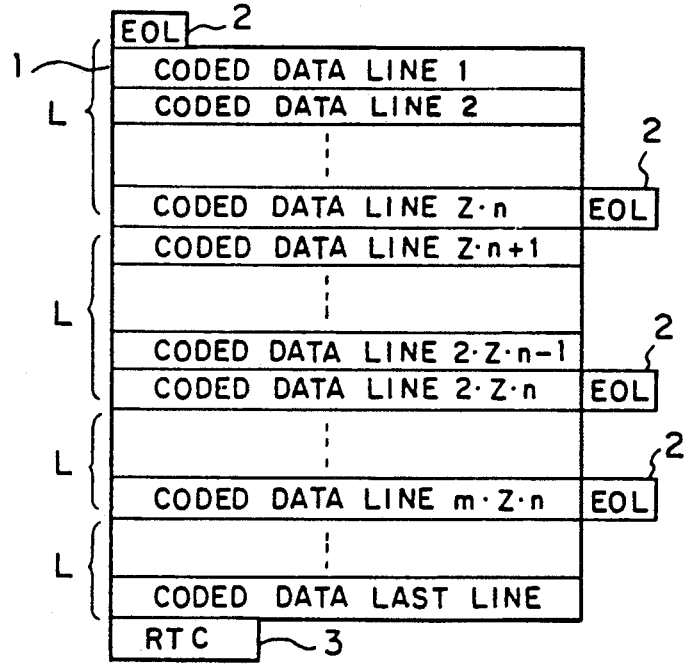
EOL: 000000000001
RTC: 000000000001 ····· 000000000001
(6 EOL'S IN TOTAL)
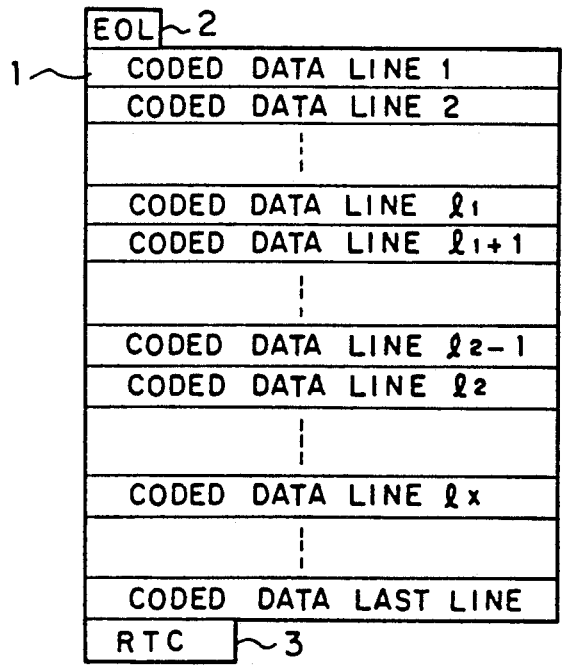
FIG. 3(c)

FIG. 8(a)
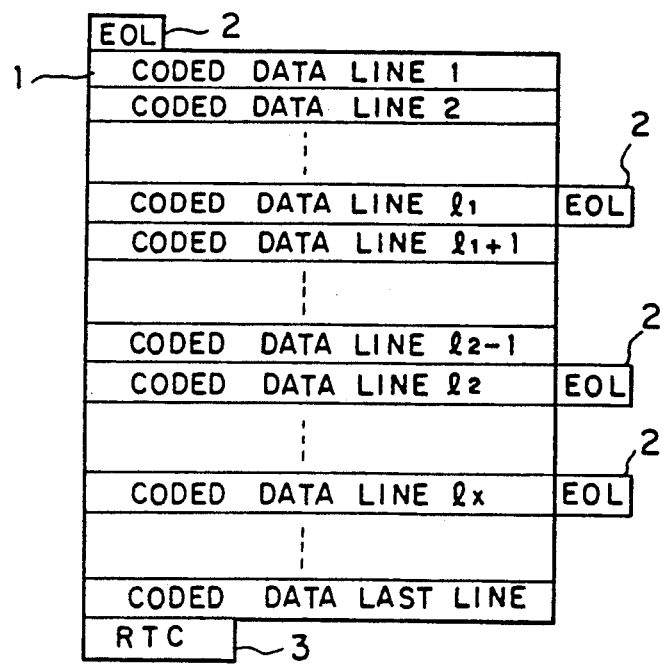
FIG. 8(b)
FIG. 8(c)
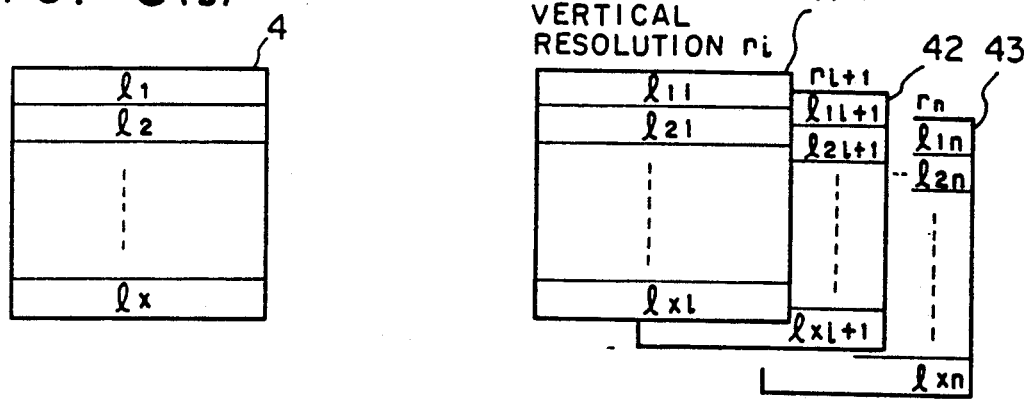

ONE-DIMENSIONAL CODING METHOD

BACKGROUND OF THE INVENTION

1. Field of the Invention

The present invention relates to a coding method for compressing the amount of image data, the method being adopted by encoders for use with facsimile machines, image filing systems and the like.

2. Description of the Prior Art

FIG. 1 illustratively shows a coding format for image data of one page for use with facsimile machines, the format being defined by Recommendation T.4 of CCITT (International Consultative Committee for Telephone and Telegraph). In FIG. 1, reference numeral 1 is MH-coded data of one line; and 2 is an end-of-line (EOL) code attached to the end of each MH-coded line as well as to the beginning of the first line of a page. The EOL is a unique code (whose format is 000000000001) that does not appear in code words constituting each of the coded lines. Thus if there occurs a code error, resynchronizing is possible in units of lines. Reference numeral 3 in FIG. 1 is a return-to-control (RTC) code which indicates the end of a page and which is made up of six EOL's 2 connected in a row. In this specification, each line refers to a line scanned in the main scanning direction.

FIG. 2 is a flowchart showing the typical prior art steps to MH-code one page of image data on a one-dimensional basis. In step ST1, an EOL 2 is attached to a line. In step ST2, one line of image data is MH-coded. In step ST3, the above process is repeated for each of the remaining lines. When one page of image data has all been coded, the RTC 3 is attached to the page in step ST4. This completes the one-dimensional coding of one page of image data.

One disadvantage of the prior art one-dimensional coding method outlined above is that a redundant EOL 2 which is 12 bits long needs to be attached to each MH-coded line. This means that when the image data of 3.85 lines/mm in vertical resolution is coded, there occurs a redundant code portion of as many as 13,716 bits added to the data.

When coded image data passes through a transmission line of a high error rate, the receiving side effectively utilizes EOL's 2 by detecting them from erroneous data for resynchronizing purposes. But if the data moves through a transmission line of a low error rate, i.e., with few errors likely to occur, the receiving side rarely needs, if ever, to carry out resynchronizing. In that case, the EOL's 2 become redundant and the transmitted or stored data contains large quantities of redundant codes.

SUMMARY OF THE INVENTION

It is therefore an object of the present invention to provide a one-dimensional coding method for controlling the attaching of EOL's to MH-coded lines in order to make coding efficiency higher.

According to one aspect of the invention, there is provided a one-dimensional coding method for attaching EOL's to lines at suitably determined intervals instead of attaching them to the end of every MH-coded line.

According to another aspect of the invention, there is provided a one-dimensional coding method for attaching EOL's to lines determined by a specific decision table instead of attaching them to the end of every MH-coded line.

According to a one-dimensional coding method of the invention, the number of EOL's is limited by attaching them to lines at suitably determined intervals or by attaching the EOL's to lines determined by a specific decision table. The smaller number of the EOL's involved contributes to higher efficiency in coding.

BRIEF DESCRIPTION OF THE DRAWINGS

FIG. 2 is a flowchart of steps constituting the prior art one-dimensional coding method;

FIGS. 8a–8c are views of the coding format for one page for use with the one-dimensional coding methods as a fifth through a seventh embodiment.

DETAILED DESCRIPTION OF THE PREFERRED EMBODIMENTS

Figure 1:
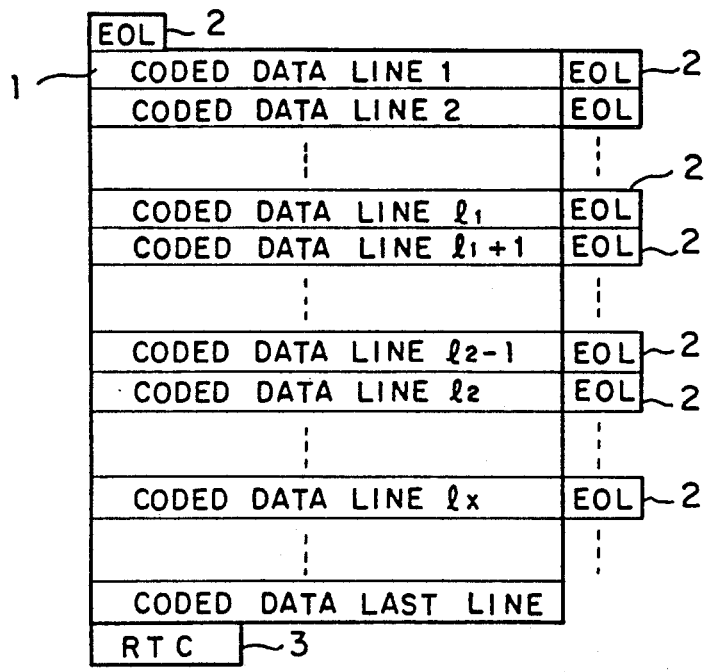
FIG. 1 is a view of the coding format for one page for use with the representative prior art one-dimensional coding method.
Figure 3:
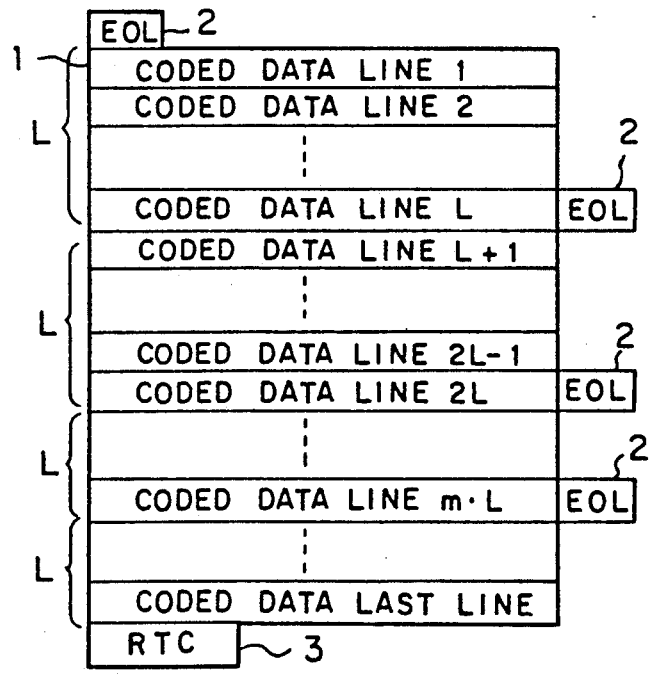
FIGS. 3a–3c are views of the coding format for one page for use with the one-dimensional coding methods as a first through a fourth embodiment of the present invention.

FIG. 3 is a view of the coding format for one page created by the one-dimensional coding methods as the first through the fourth embodiment of the present invention. In this coding format, the number of lines (L) is set as the intervals at which EOL's 2 are attached to lines. There are four methods for setting the number of lines (L) and for attaching EOL's 2 to line ends:

(1) As shown in FIG. 3(a), a predetermined number of lines (L) is set in advance. EOL's 2 are attached to the MH-coded lines corresponding to line numbers which are multiples of the predetermined number of lines.

(2) As shown in FIG. 3(b), a predetermined vertical length "n" (mm) is set in advance so as to indirectly determine the number of lines (L). That is, the vertical length "n" (mm) is set with respect to the image data having a vertical resolution of "z" (lines/mm). EOL's 2 are attached to the MH-coded lines corresponding to the line numbers which is obtained by a corrective expression [l=m.z.n (m=1, 2, etc., m indicating where a particular EOL is located as counted from the first EOL except for the EOL at the top of the page)]. In this case, L is given by "z.n" which varies with the vertical resolution (z).

(3) As shown in FIG. 3(c), the number of lines (L) is fixedly set as infinite ($\infty$) in advance. In this case, almost no EOL's 2 are attached to lines. This method is suitable for systems where few errors are expected to occur. Such systems include an image filing system that does not use transmission lines, and a facsimile system that has error correction mode.

(4) According to the first or the second method described above, the error-affected length in case of an error during decoding is constant regardless of how much image data has been lost as a result of that error.

This disadvantage is circumvented by selecting either the first or the second method depending on the quality of the transmission line used by the facsimile machine and/or the degree of importance for the image data involved, and by determining number of lines (L) adaptively.

Figure 4:
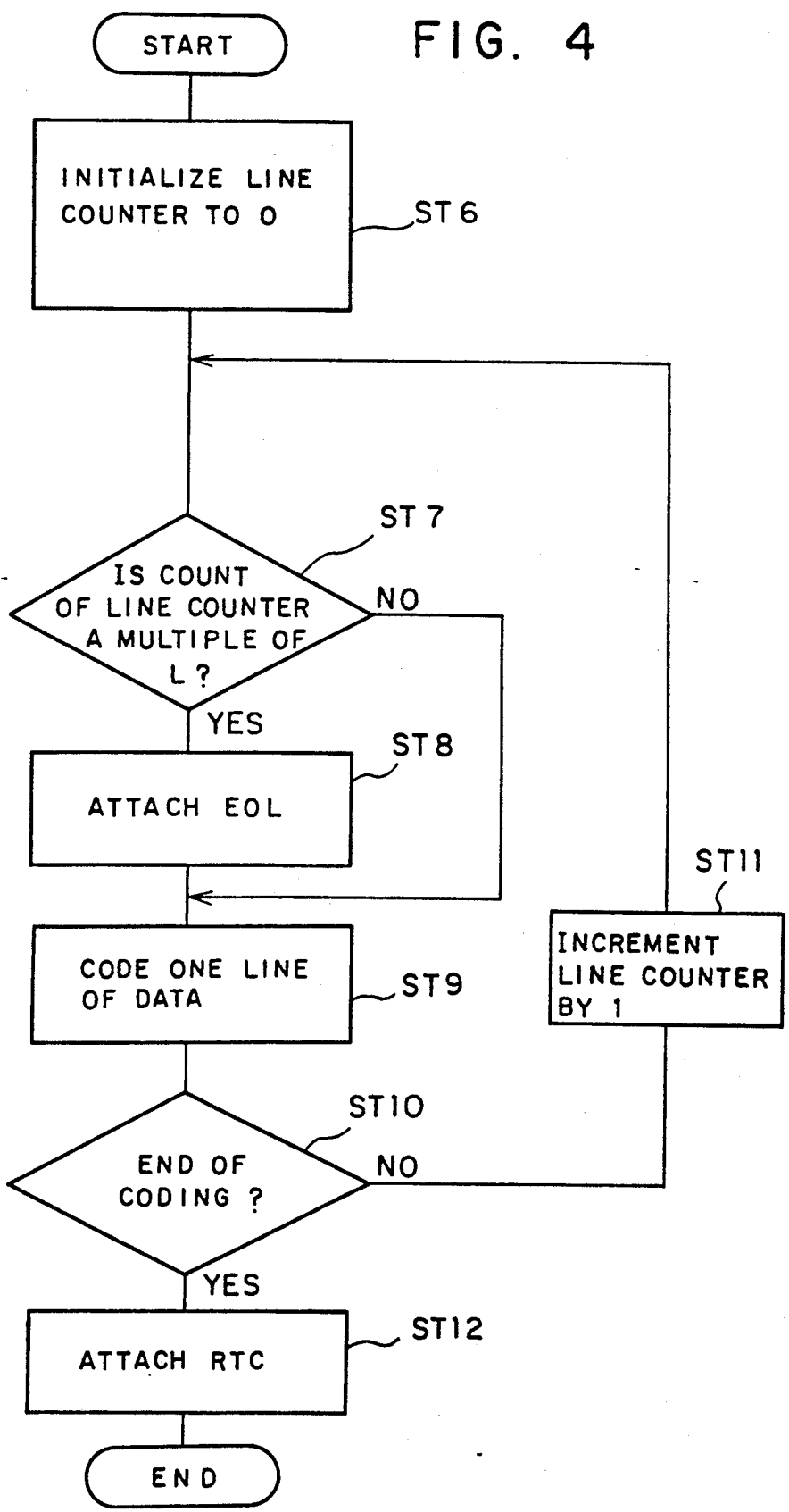
FIGS. 4 through 7 are flowcharts of steps constituting the one-dimensional coding methods as the first through the fourth embodiment of the invention, respectively.

How image data is coded according to the first method above will now be described with reference to FIG. 4. In step ST6, a line counter is initialized to zero. In step ST7, a check is made to see if the line number of the MH-coded line is a multiple (zero is included) of a number of lines (L) fixedly determined in advance. If the result of the check in step ST7 is affirmative, step ST8 is reached. In step ST8, an EOL 2 is attached prior to the first line of a page, or to the end of the current line. If the check in step ST7 shows that the line number is not a multiple of the predetermined number of lines (L), no EOL is attached and step ST9 is reached. In step ST9, one line of image data is MH-coded. The same process is repeated through steps ST10 and ST11 for all lines. When the coding of one page of image data has ended, step ST12 is reached. In step ST12, an RTC 3 is attached to the page. This completes the one-dimensional coding of the current page.

Figure 5:
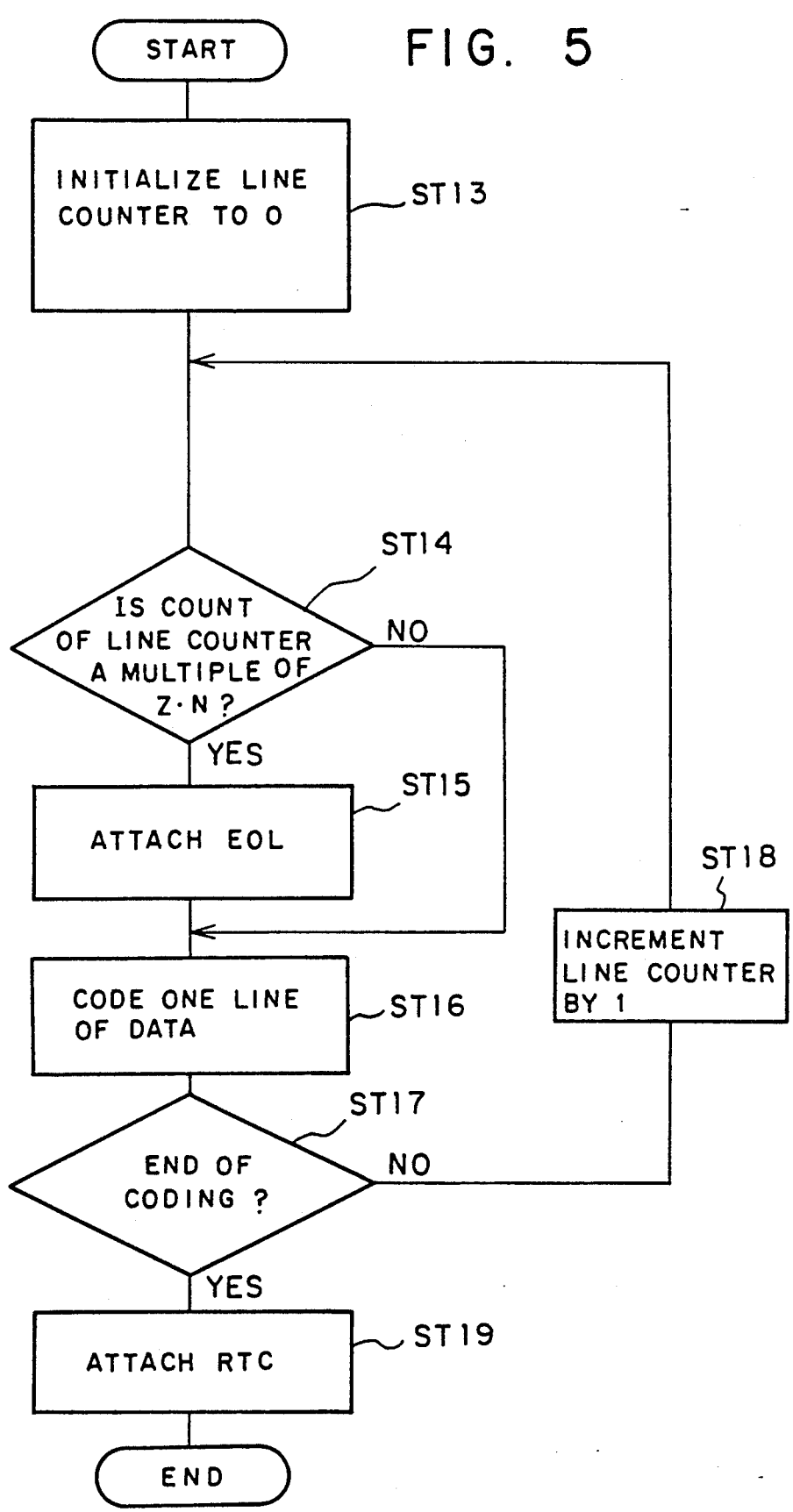

Next, how image data is coded according to the second method above will now be described with reference to FIG. 5. In step ST13, the line counter is initialized to zero. In step ST14, a check is made to see if the line number of the MH-coded line is equal to a line number (l) obtained by the foregoing corrective expression, that is, if the line number of the MH-coded line is a multiple (zero is included) of the number (L) (L=z.n) where n (mm) is a fixedly predetermined vertical length and z (lines/mm) is a vertical resolution. If the result of the check in step ST14 is affirmative, an EOL 2 is attached prior to the first line of a page, or to the end of the current line in step ST15. If the check in ST14 shows that the line number is not equal to the number (l), no EOL is attached and step ST16 is reached. In step ST16, one line of image data is MH-coded. The same process is repeated through steps ST17 and ST18 for all lines. When the coding of one page of image data has ended, step ST19 is reached. In step ST19, an RTC 3 is attached to the current page. This completes the one-dimensional coding of the current page. According to the second method, one EOL 2 is attached to the lines corresponding to the vertical length (n) regardless of what the vertical resolution is for the image data.

Figure 6:
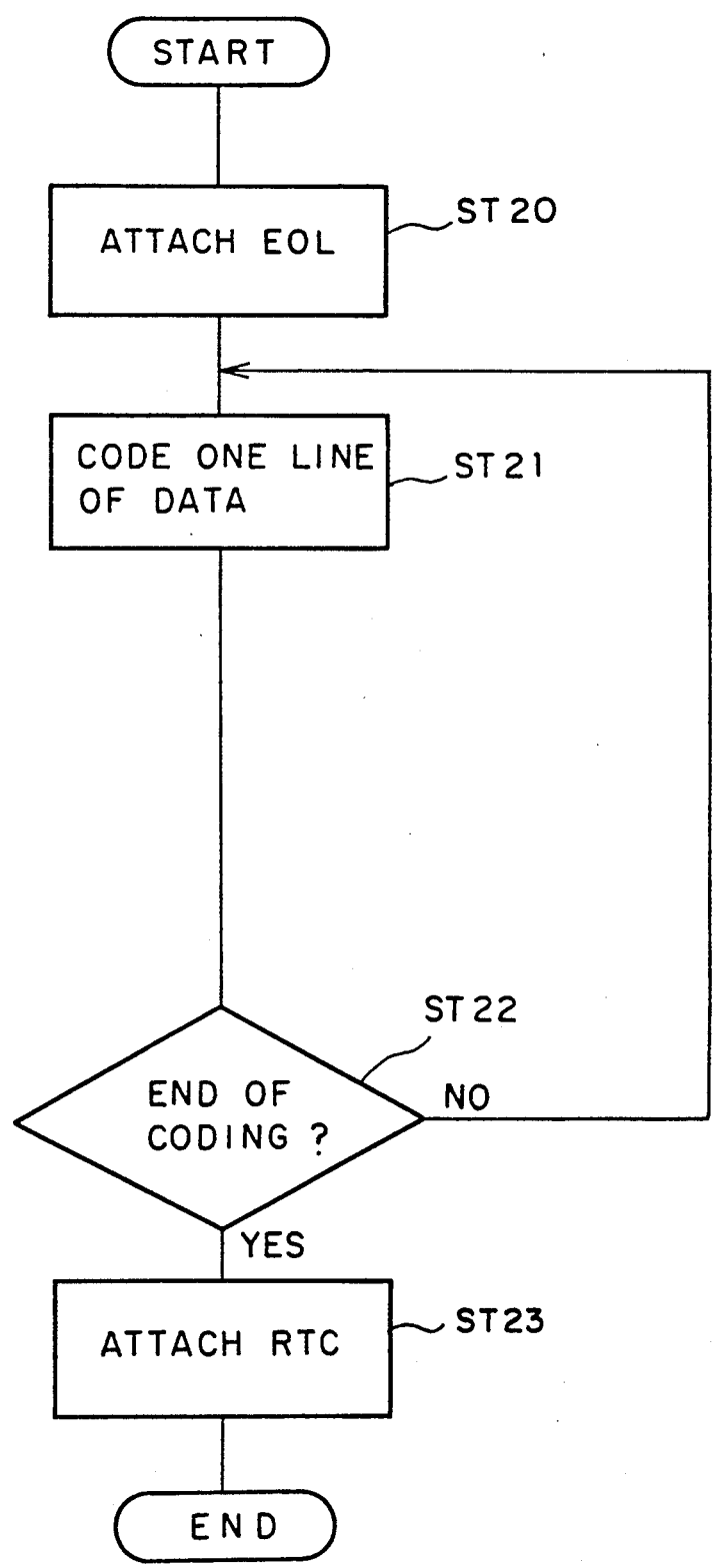

The coding of image data according to the third method above will now be described with reference to FIG. 6. In step ST20, an EOL 2 is attached to a page to indicate the top thereof. In step ST21, one line of image data is MH-coded. The same process is repeated through step ST22 for all lines. When the coding of one page of image data has ended, an RTC 3 is attached in step ST23. This completes the one-dimensional coding of one page according to the third method.

Figure 7:
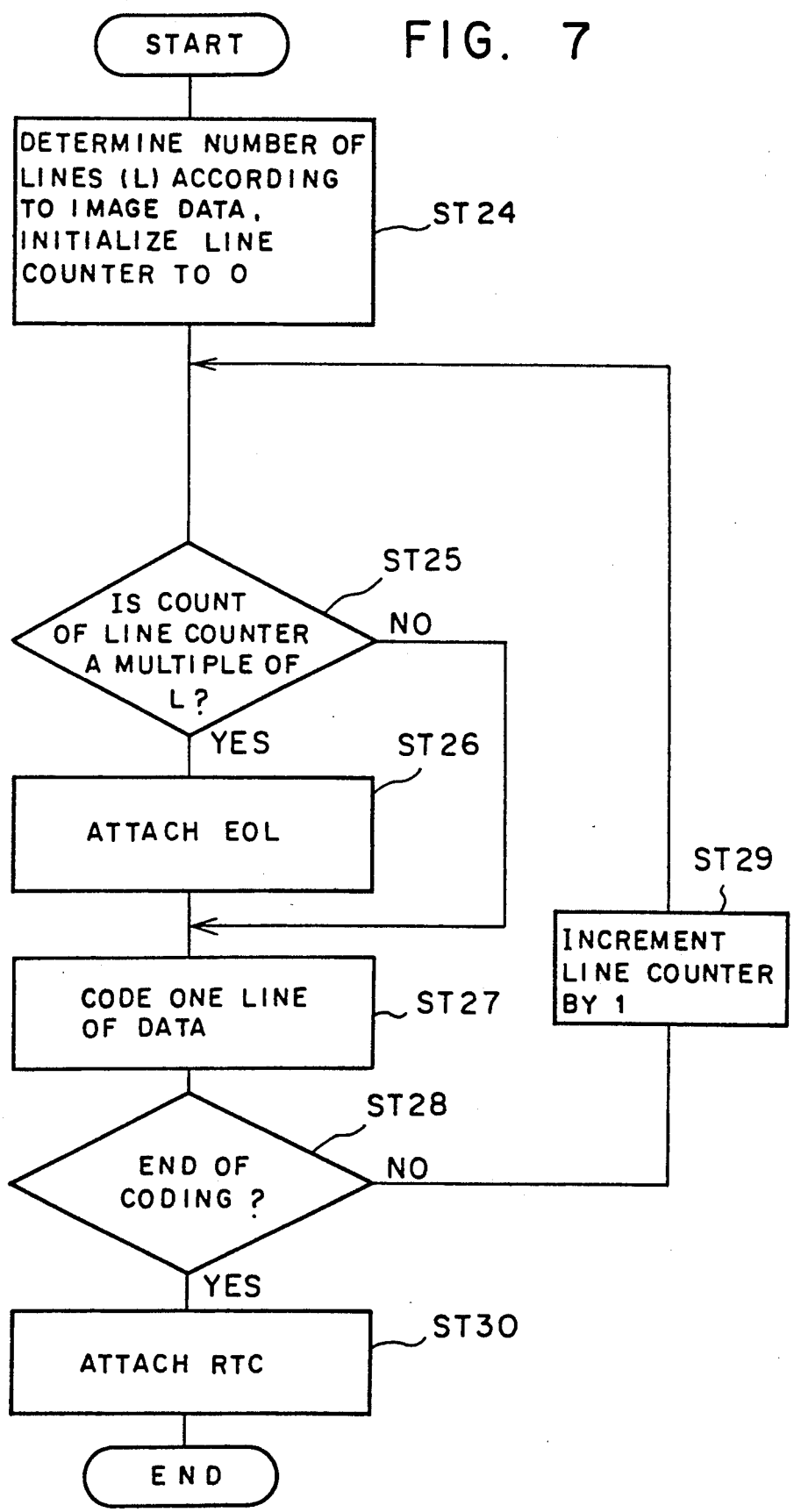

The coding of image data according to the fourth method mentioned above will now be described with reference to FIG. 7. Described first is the case where the first method is selected. In step ST24, the number of lines (L) is adaptively determined by considering the status of the transmission line used by the facsimile machine or the like, for example, an error rate of a precede page, an error rate of a precede transmission, or a convergence degree of eye pattern of modem. In addition, the line counter is initialized to zero. In step ST25, a check is made to see if the line number of the MH-coded line is a multiple (zero is included) of the number of lines (L) adaptively set in step ST24. If the line number is a multiple of the number of lines (L), an EOL 2 is attached prior to the first line of a page, or to the end of the current line in step ST26. If the line number is not a multiple of the number of lines (L), no EOL 2 is attached. In step ST27, one lnie of image data is MH-coded. The same process is repeated through steps ST28 and ST29 for all lines. When the coding of one page of image data has ended, an RTC 3 is attached to the page in step ST30. This completes the one-dimensional coding of the current page of image data.

Where the second method is selected under the fourth method, the coding likewise takes place. That is, in step ST13 of FIG. 5, the vertical length (n) is adaptively determined by considering the status of the transmission line or other relevant factors before initialization of the line counter.

For example, where a Group 3 facsimile transmission is to be carried out, the status of the transmission line may be approximately estimated using the training check signal stipulated by the CCITT Recommendation T.30. If the status of the transmission line is estimated to involve a high error rate, the number of lines (L) and the vertical length (n) are set for small values. If the error rate involved is found to be low, the number of lines (L) and the vertical length (n) are set for large values.

If it is permissible to have a certain degree of disturbance in the decoded image, the importance of image data is regarded as low. In that case, the number of lines (L) and the length (n) are set for very large values (e.g., infinite). If no disturbance is permitted in the decoded image, the importance of image data is regarded as high. In that case, the number of lines (L) and the length (n) are set for small values (e.g., L=1). It is conventionally possible to modify the facsimile machine or the like so that its operator may set the importance of image data.

The embodiment involving the use of decision tables will now be described with reference to the accompanying figures. FIG. 8 is a view of the coding format and the decision tables for one page for use with one-dimensional coding methods according to the invention. In FIG. 8, reference numeral 4 is a decision table in which are specified beforehand the numbers pointing to the line numbers of the lines to which EOL's 2 may be attached Reference numerals 41, 42 and 43 are decision tables established according to varying degrees of vertical resolution for image data. These decision tables also contain the numbers pointing to the line numbers of the lines to which EOL's 2 are to be attached. There are three methods by which to attach EOL's 2 to the lines using the decision tables:

(1) The first method involves attaching EOL's 2 according to the decision table 4 of FIG. 8(b) in which are set beforehand the numbers pointing directly to the line numbers of the lines to which the EOL's are to be attached.

(2) The second method involves attaching EOL's 2 according to the selected one of the decision tables 41, 42 and 43 of FIG. 8(c) in which are set beforehand the numbers pointing directly to the line numbers of the lines to which the EOL's are to be attached.

(3) With the third method, the foregoing decision table 4 is provided only for one vertical resolution "x" (lines/mm). The vertical resolution of the actually coded image data is represented by "y" (lines/mm). The line number li of the MH-coded line is corrected by a corrective expression INT (li x x/y). The decision table 4 is searched for the integer obtained using the corrective expression. If the integer is found in the decision table 4, an EOL 2 is attached to the MH-coded line. The code INT in the corrective expression above is an integer-making code that omits fractions.

Figure 9:
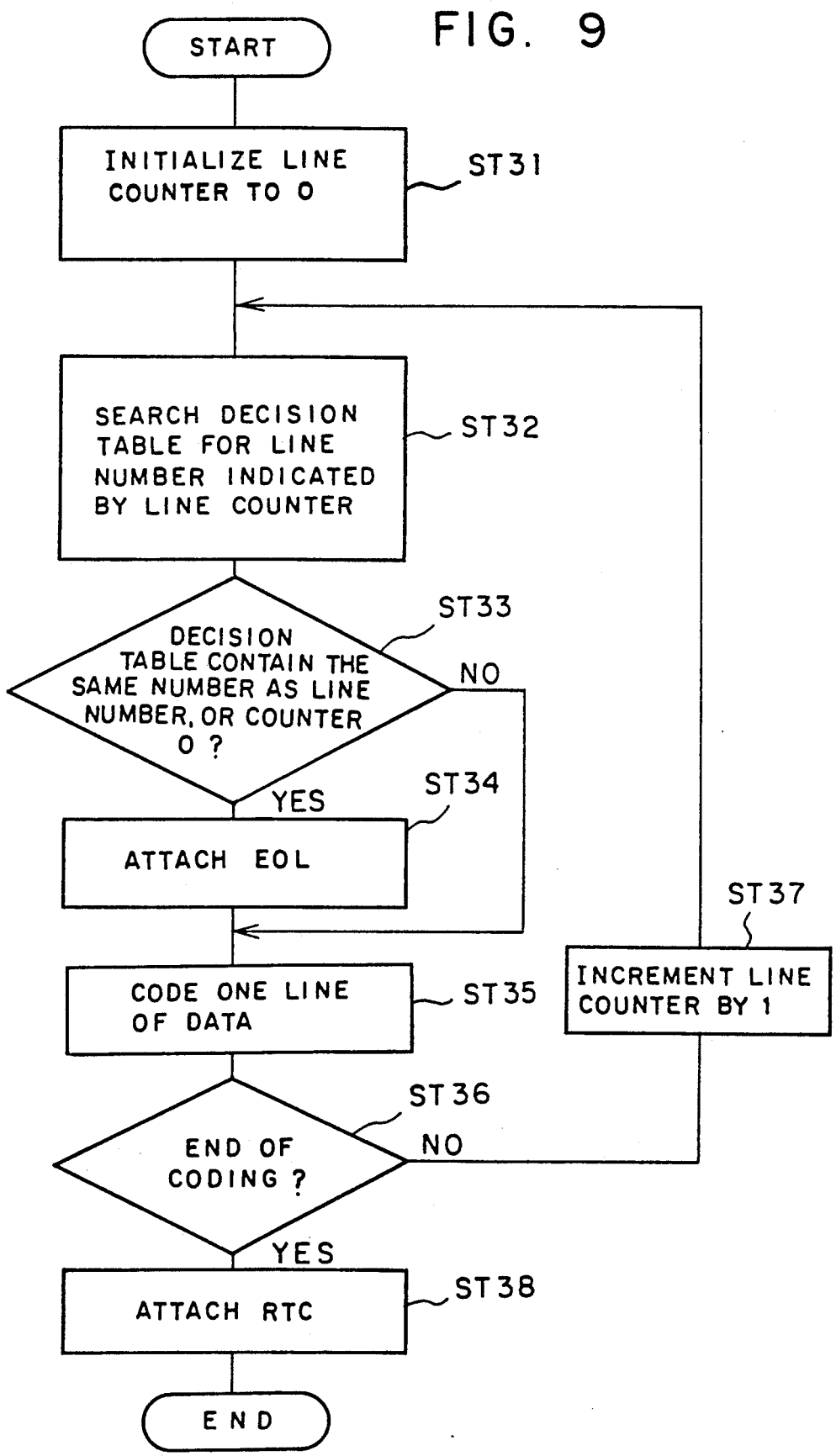
FIGS. 9 through 11 are flowcharts of steps constituting the one-dimensional coding methods as the fifth through the seventh embodiment of the present invention, respectively.

How the coding of image data is carried out according to the first method will now be described with reference to FIG. 9. In step ST31, the line counter is initialized to zero. In step ST32, the decision table 4 is searched for the current line number indicated by the line counter. In step ST33, a check is made to see if the line number coincides with any of the numbers that exist in the decision table 4, or the line counter is zero. If there is a matching number or the line counter is zero, step ST34 is reached. In step ST34, an EOL 2 is attached prior to the first line of a page, or to the end of the line indicated by the line number detected. If there is no matching number, and the line counter is not zero, no EOL is attached. In step ST35, one line of image data is MH-coded. The same process is repeated through steps ST36 and ST37 for all lines. When the coding of one page of image data has ended, an RTC 3 is attached to the page in step ST 38. This completes the one-dimensional coding of the current page of image data.

Figure 10:
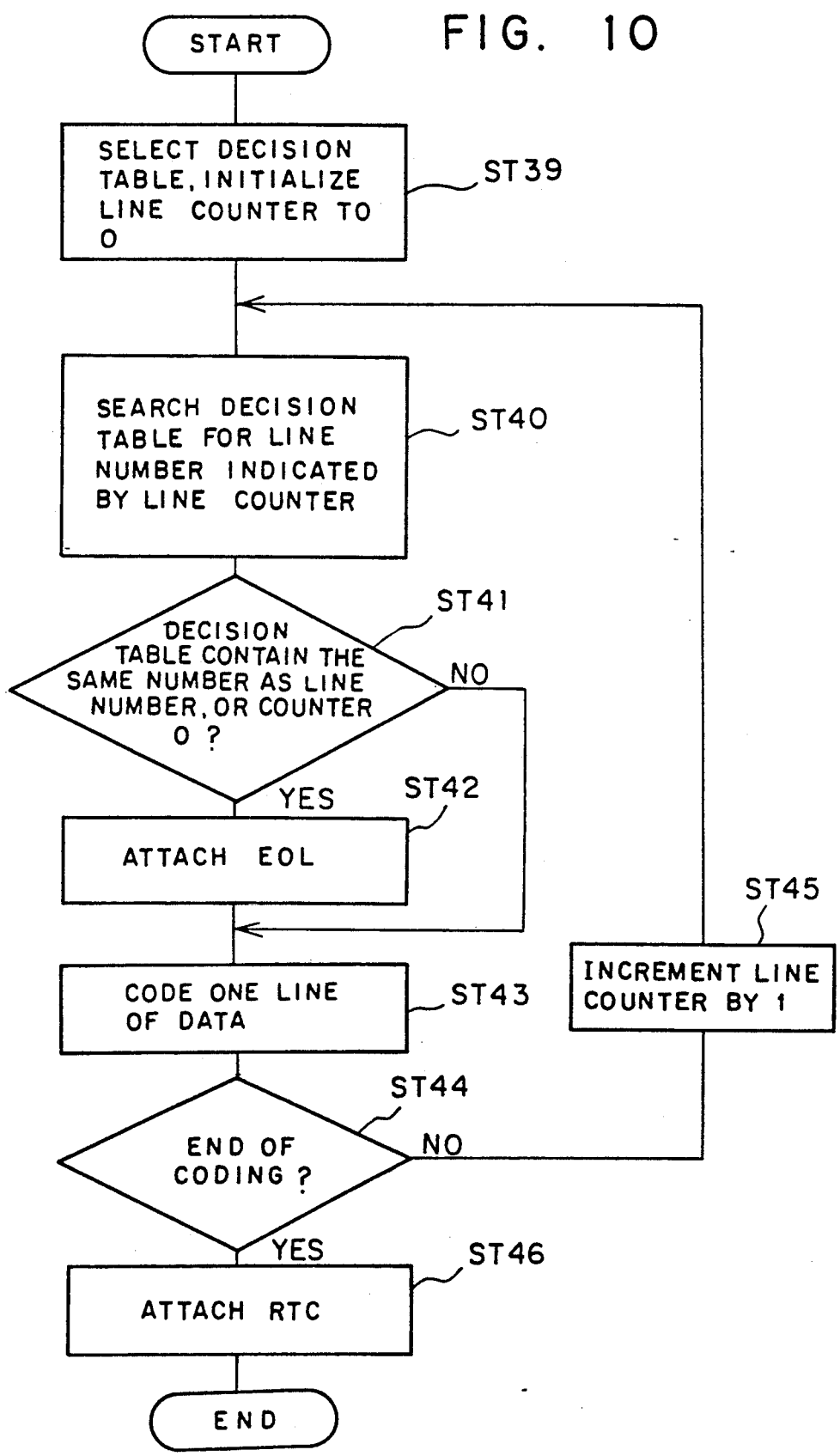

The coding of image data based on the second method above will now be described with reference to FIG. 10. In step ST39, first, one of the decision tables 41, 42 and 43 is selected in accordance with the vertical resolution set for the image data. For example, assume that $r_i=3.85$, $r_{i+1}=7.7$ and $r_n=15.4$ for the decision tables 41, 42 and 43, respectively, and that the vertical resolution for the image data is 3.85 (lines/mm). In that case, the decision table 41 is selected, for which $r_i=3.85$. Next, the line counter is initialized to zero. In step ST40, the selected decision table 41, 42 or 43 is searched. In step ST41, a check is made through the search to see if the line number indicated by the line counter coincides with any of the numbers that exist in the selected decision table, or a check is made if the line counter is zero. If there is a matching number or the line counter is zero, step ST42 is reached. In step ST42, an EOL 2 is attached prior to the first line of a page, or to the end of the line indicated by the matched line number. If there is no matching number found in the decision table and the line counter is not zero, no EOL is attached. In step ST43, on line of image data is MH-coded. The same process is repeated through steps ST44 and ST45 for all lines. When the coding of one page of image data has ended, an RTC 3 is attached to the page in step ST46. This completes the one-dimensional coding of the current page.

Figure 11:
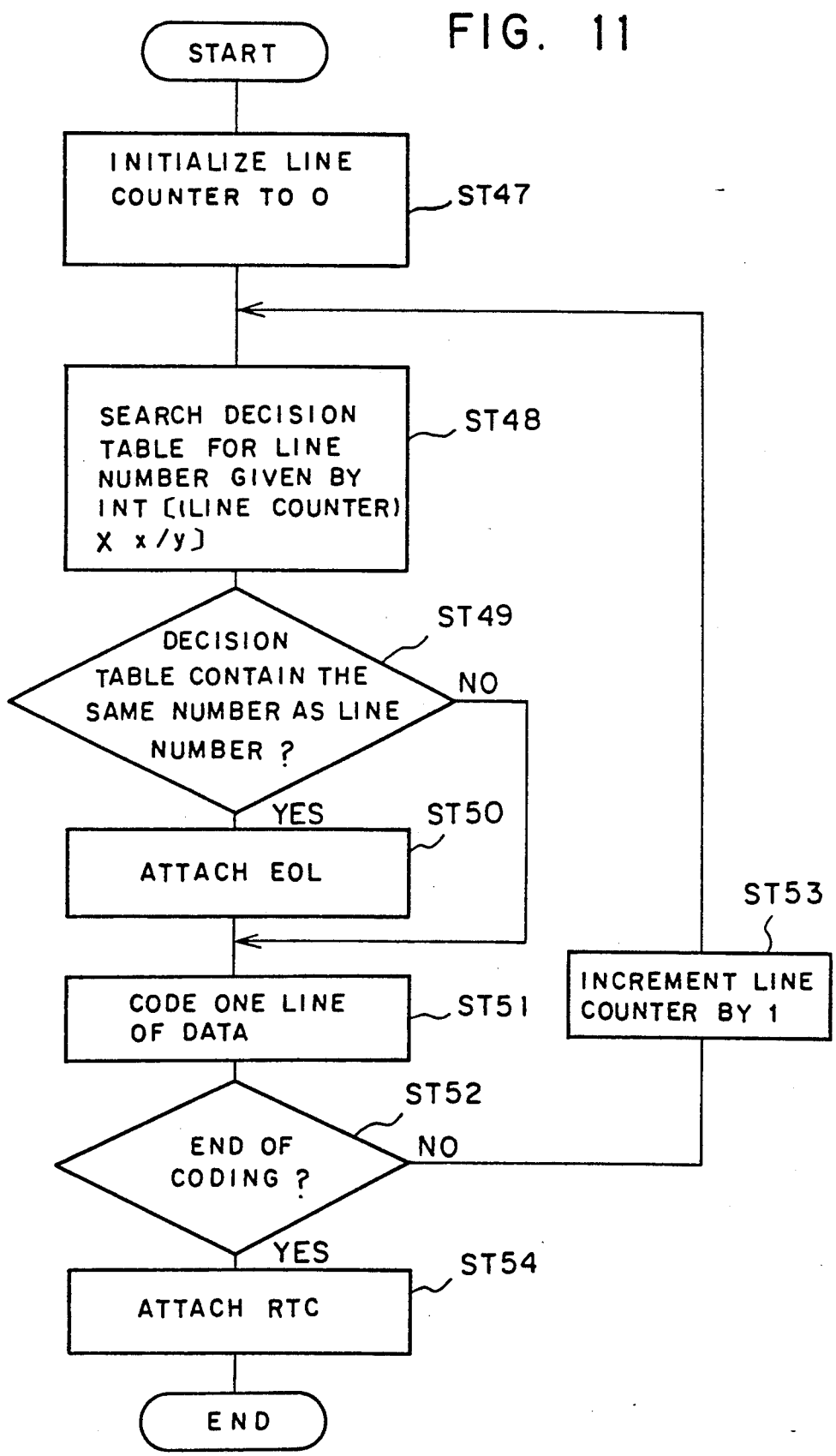

The coding of image data according to the third method above will now be described with reference to FIG. 11. In step ST47, the line counter is initialized to zero. In step ST48, a corrective expression INT [(line counter value) x x/y] is used to obtain an integer, where "x" (lines/mm) is the vertical resolution for the decision table 4, and "y" (lines/mm) is the vertical resolution for the image data to be actually MH-coded. The decision table 4, which is the only decision table provided in this case, is searched for the integer obtained as the line number. In step ST49, a check is made through the search to see if the same number as that line number exists in the decision table 4, or a check is made if the line counter is zero. For Example, assume that the decision table 4 corresponds to a vertical resolution of 3.85 (lines/mm) and that the vertical resolution for the image data is 7.7 (lines/mm). In that case, the line number for the search is obtained using the corrective expression $$INT\ [(line\ counter\ value) \times 3.85/7.7]$$

If the same number as the line number is found to exist in the decision table 4 as a result of the search therethrough or the line coutner is zero, an EOL 2 is attached prior to the first line of a page, or to the end of the line specified by the current line counter value (indicating the actual line number). If the same number is not found in the decision table 4 and the line counter is not zero, no EOL is attached. In step ST51, one line of image data is MH-coded. The same process is repeated through steps ST52 and ST53 for all lines. When the coding of one page of image data has ended, an RTC 3 is attached to the page in step ST54. This completes the one-dimensional coding of the current page of image data.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A one-dimensional coding method for MH-coding one page of image data in units of lines in order to compress the amount of said image data, said method comprising the steps of:

MH-coding one line of said image data;

checking to see if a line number of said MH-coded line is a multiple of a fixedly established number of lines (L);

attaching an end-of-line code to the MH code of said MH-coded line when said line number is a multiple of said number of lines (L); and attaching an end-of-page code to the MH code of the last line of said image data when the MH-coding of all lines constituting said image data has terminated.

2. A one-dimensional coding method according to claim 1, further comprising the step of determining the number of lines (L) in accordance with the status of the transmission line for use before a first line of said image data is MH-coded.

3. A one-dimensional coding method according to claim 1, further comprising the step of determining the number of lines (L) in accordance with the degree of importance for said image data before a first line of said image data is MH-coded.

4. A one-dimensional coding method for MH-coding one page of image data in units of lines in order to compress the amount of said image data, said method comprising the steps of:

MH-coding one line of said image data;

checking to see if a line number of said MH-coded line is a multiple of the product of a fixedly established length (n) and a vertical resolution (z) for said image data;

attaching an end-of-line code to the MH code of said MH-coded line when said line number is a multiple of said product (n.z); and attaching an end-of-page code to the MH code of the last line of said image data when the MH-coding of all lines constituting said image data has terminated.

5. A one-dimensional coding method according to claim 4, further comprising the step of establishing the length (n) in accordance with the status of the transmission line for use before a first line of said image data is MH-coded.

6. A one-dimensional coding method according to claim 4, further comprising the step of establishing the length (n) in accordance with the degree of importance for said image data before a first line of said image data is MH-coded.

7. A one-dimensional coding method for MH-coding one page of image data in units of lines in order to compress the amount of said image data, said method comprising the steps of:

MH-coding one line of said image data;

checking to see if a line number of said MH-coded line coincides with any of numbers contained in a decision table, said numbers pointing to the line numbers of the lines to which an end-of-line code is to be attached each;

attaching an end-of-line code to the MH code of said MH-coded line when said line number coincides with any of said numbers contained in said decision table; and attaching an end-of-page code to the MH code of the last line of said image data when the MH-coding of all lines constituting said image data has terminated.

8. A one-dimensional coding method for MH-coding one page of image data in units of lines in order to compress the amount of said image data, said method comprising the steps of:

selecting one of decision tables each corresponding to one of vertical resolutions that may exist for image data in general, said decision tables containing numbers pointing to line numbers of lines to which an end-of-line code is to be attached each, said selected decision table corresponding to a vertical resolution applicable to said image data to be coded;

MH-coding one line of said image data;

checking to see if the line number of said MH-coded line coincides with any of the numbers contained in said selected decision table;

attaching an end-of-line code to the MH code of said MH-coded line when said line number coincides with any of the numbers contained in said selected decision table; and attaching an end-of-page code to the MH code of the last line of said image data when the MH-coding of all lines constituting said image data has terminated.

9. A one-dimensional coding method for MH-coding one page of image data in units of lines in order to compress the amount of said image data, said method comprising the steps of:

MH-coding one line of said image data;

correcting a line number of said MH-coded line for making a line number for search by multiplying said line number of MH-coded line and a value together, the value is obtained by dividing a vertical resolution corresponding to a decision table containing numbers pointing to line numbers of lines to which an end-of-line code is to be attached by a vertical resolution of said image data to be coded;

checking to see if said line number for search coincides with any of the numbers contained in said decision table;

attaching an end-of-line code to the MH code of said MH-coded line when said line number for said search coincides with any of the numbers contained in said decision table; and attaching an end-of-page code to the MH code of the last line of said image data when the MH-coding of all lines constituting said image data has terminated.

* * * * *

UNITED STATES PATENT AND TRADEMARK OFFICE
CERTIFICATE OF CORRECTION

PATENT NO. : 5,206,742

DATED : April 27, 1993

INVENTOR(S) : Itsuya Soga et al.

It is certified that error appears in the above-identified patent and that said Letters Patent is hereby corrected as shown below:

On the cover page, in the Abstract, line 2,
  "machies" should be --machines--.

Column 3, line 49, "data.according" should be
  --data according--.

Column 4, line 7, "lnie" should be --line--;
         line 47, after "attached" insert a
  period --.--.

Column 6, line 9, "coutner" should be --counter--.

Signed and Sealed this

Fourth Day of January, 1994

Attest:

BRUCE LEHMAN

*Attesting Officer*    Commissioner of Patents and Trademarks